United States Patent [19]
Yu et al.

[11] Patent Number: 6,095,864
[45] Date of Patent: Aug. 1, 2000

[54] ELECTRICAL CARD CONNECTOR INCORPORATING A GROUNDING PLATE

[75] Inventors: Hung-Chi Yu, Hsi-Chih, Taiwan; Tomohisa Hara, Nagano, Japan

[73] Assignee: Hon Hai Precision Ind. Co., Ltd., Taipei Hsien, Taiwan

[21] Appl. No.: 09/334,363

[22] Filed: Jun. 16, 1999

[30] Foreign Application Priority Data

Jan. 29, 1999 [TW] Taiwan ................................ 88201516

[51] Int. Cl.[7] .................................................. H01R 13/648
[52] U.S. Cl. .......................................... 439/607; 439/108
[58] Field of Search .................................. 439/607, 609, 439/108, 159

[56] References Cited

U.S. PATENT DOCUMENTS

| | | | |
|---|---|---|---|
| 4,906,199 | 3/1990 | Twomey et al. ........................ | 439/108 |
| 5,292,268 | 3/1994 | Walkup .................................... | 439/108 |
| 5,470,238 | 11/1995 | Walden .................................... | 439/607 |
| 5,947,769 | 9/1999 | Leonard et al. ......................... | 439/607 |
| 5,959,244 | 9/1999 | Mayer ..................................... | 439/108 |

FOREIGN PATENT DOCUMENTS 406068936  3/1994  Japan ..................................... 439/607

*Primary Examiner*—Gary F. Paumen
*Assistant Examiner*—Tho D. Ta
*Attorney, Agent, or Firm*—Wei Te Chung

[57] ABSTRACT

An electrical card connector includes a header having a top surface forming a pair of screw holes. A grounding plate is attached to the top surface of the header and forms a pair of first holes. A pressing sheet is attached to the grounding plate and forms a pair of second holes. A screw extends through each second hole of the pressing sheet and each first hole of the grounding plate to threadedly engage with each screw hole of the header.

5 Claims, 5 Drawing Sheets

ELECTRICAL CARD CONNECTOR INCORPORATING A GROUNDING PLATE

BACKGROUND OF THE INVENTION

1. Field of the Invention

The present invention relates to an electrical card connector, and particularly to an electrical card connector having a grounding plate securely attached thereto.

2. Description of Prior Art

Some electrical card connectors have grounding plates attached to headers thereof, as shown in FIGS. 1 and 2. An electrical card connector includes a header 7, a grounding plate 8 attached to the header 7, and a casing 9 engaged with the header 7. The header 7 includes two arms 71 each forming an arm slot 72 in a middle portion thereof, and a body 73 connecting the two arms 71. Two longitudinal slots 74 are defined in a middle portion of a top face of the header 73, and two lateral slots 75 are defined in the top face proximate opposite ends thereof. The grounding plate 8 forms two longitudinal tabs 81 in a middle portion thereof corresponding to the longitudinal slots 74 of the header 7, two lateral tabs 82 downwardly extending from opposite edges thereof corresponding to the lateral slots 75 of the header 7, and two arm tabs 83 downwardly extending from opposite edges thereof corresponding to the arm slots 72 of the header 7. In assembly, the tabs 81, 82, 83 of the grounding plate 8 are inserted into the corresponding slots 74, 75, 72 of the header 7, thereby attaching the grounding plate 8 to the header 7. However, the grounding plate 8 may become easily dislodged from the header 7 since the tabs 81, 82, 83 are not positively fixed in the slots 74, 75, 72, as shown in FIG. 3. Thus, the grounding plate 8 cannot maintain a secure electrical connection with an inserted electrical card.

SUMMARY OF THE INVENTION

Accordingly, an object of the present invention is to provide an electrical card connector having a pressing sheet for securely attaching a grounding plate to the connector for maintaining a secure electrical connection with an inserted electrical card.

In a preferred embodiment of the present invention, an electrical card connector comprises a header having a top surface forming a pair of screw holes. A grounding plate is attached to the top surface of the header and forms a pair of first holes. A pressing sheet is attached to the grounding plate and forms a pair of second holes. A screw extends through each second hole of the sheet and each first hole of the grounding plate to threadedly engage with each screw hole of the header.

BRIEF DESCRIPTION OF THE DRAWINGS

Other objects and advantages of the present invention will be understood from the following description of an electrical card connector according to a preferred embodiment of the present invention shown in the accompanying drawings, in which.

DETAILED DESCRIPTION OF THE PREFERRED EMBODIMENT

Figure 1:
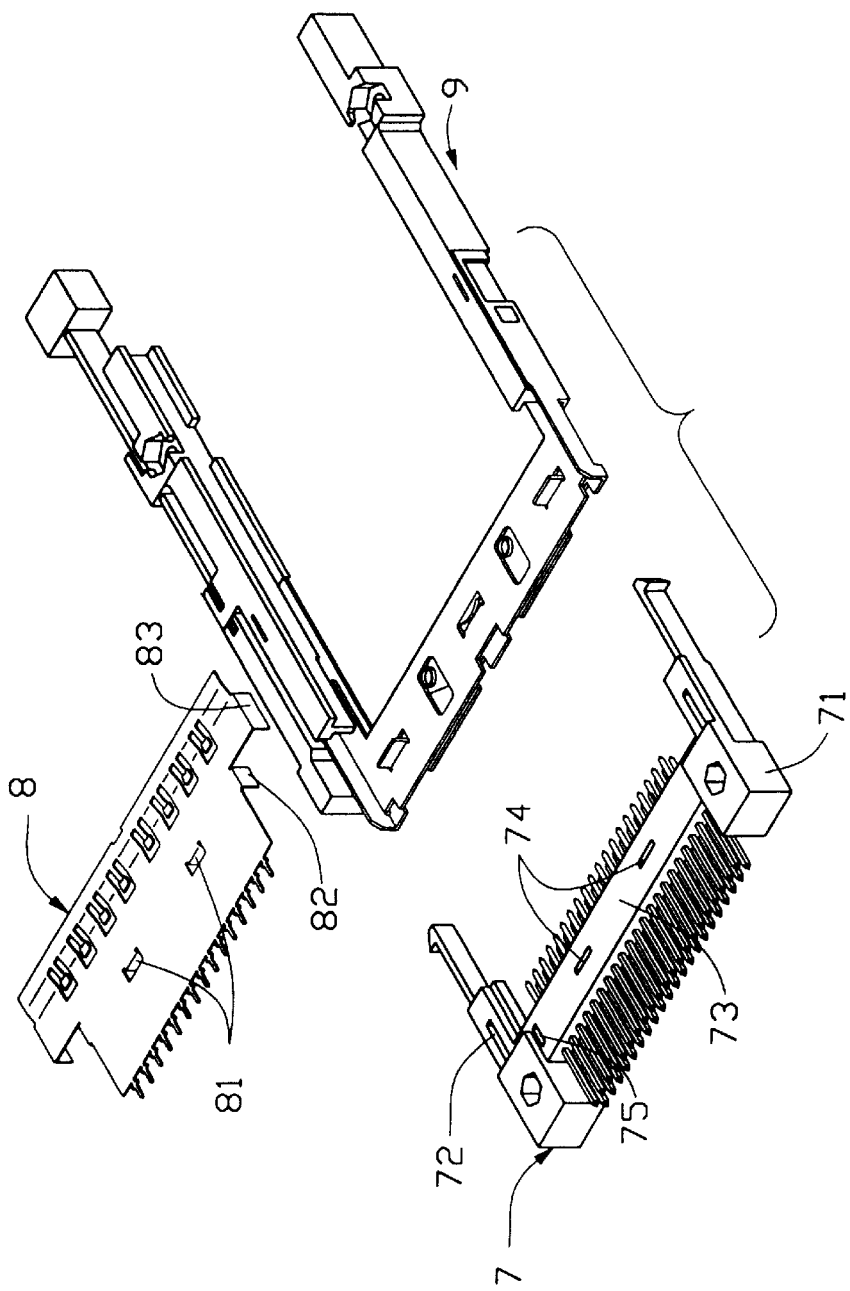
FIG. 1 is an exploded view of a conventional connector.
Figure 2:
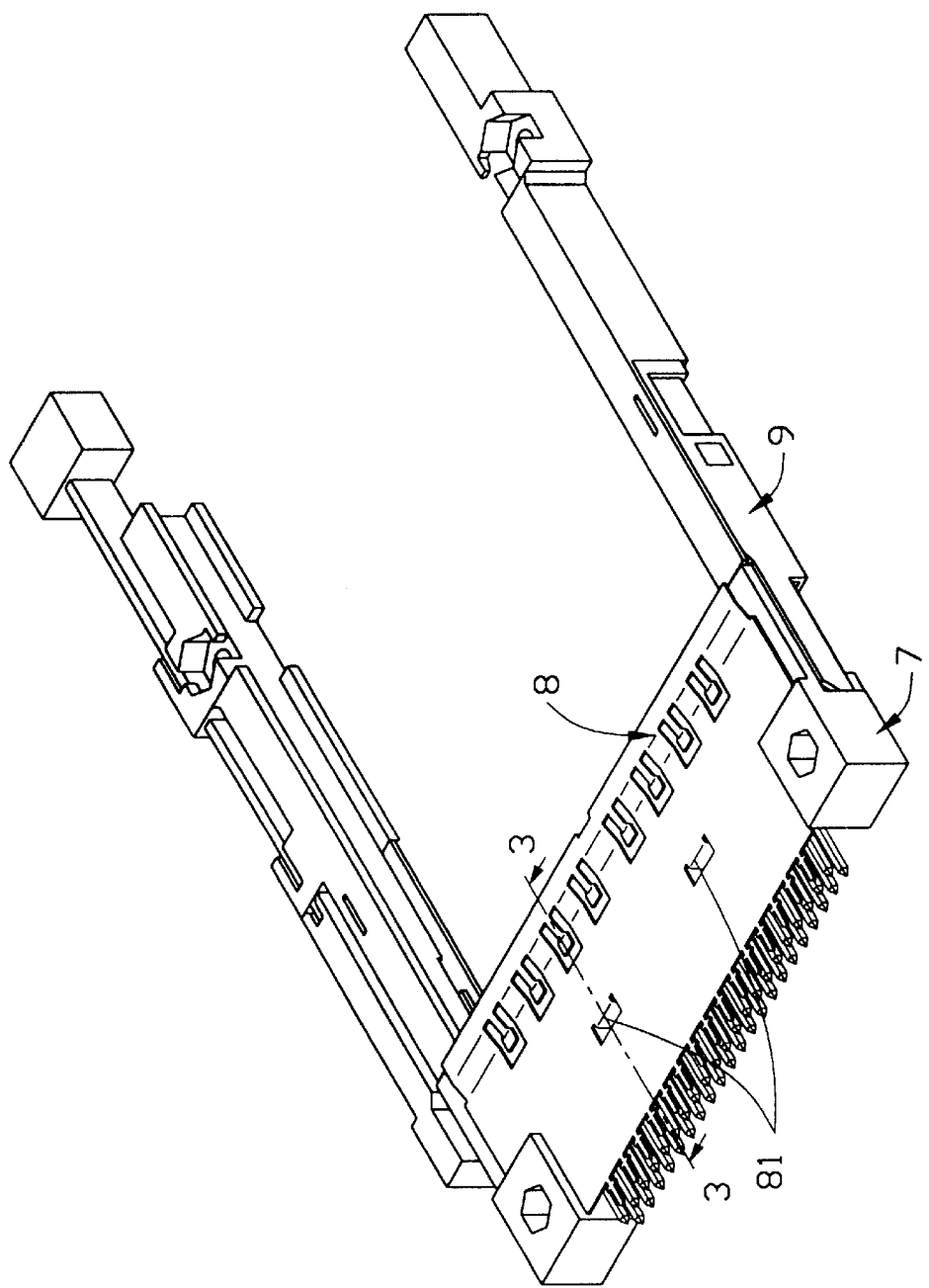
FIG. 2 is an assembled view of FIG. 1.
Figure 3:
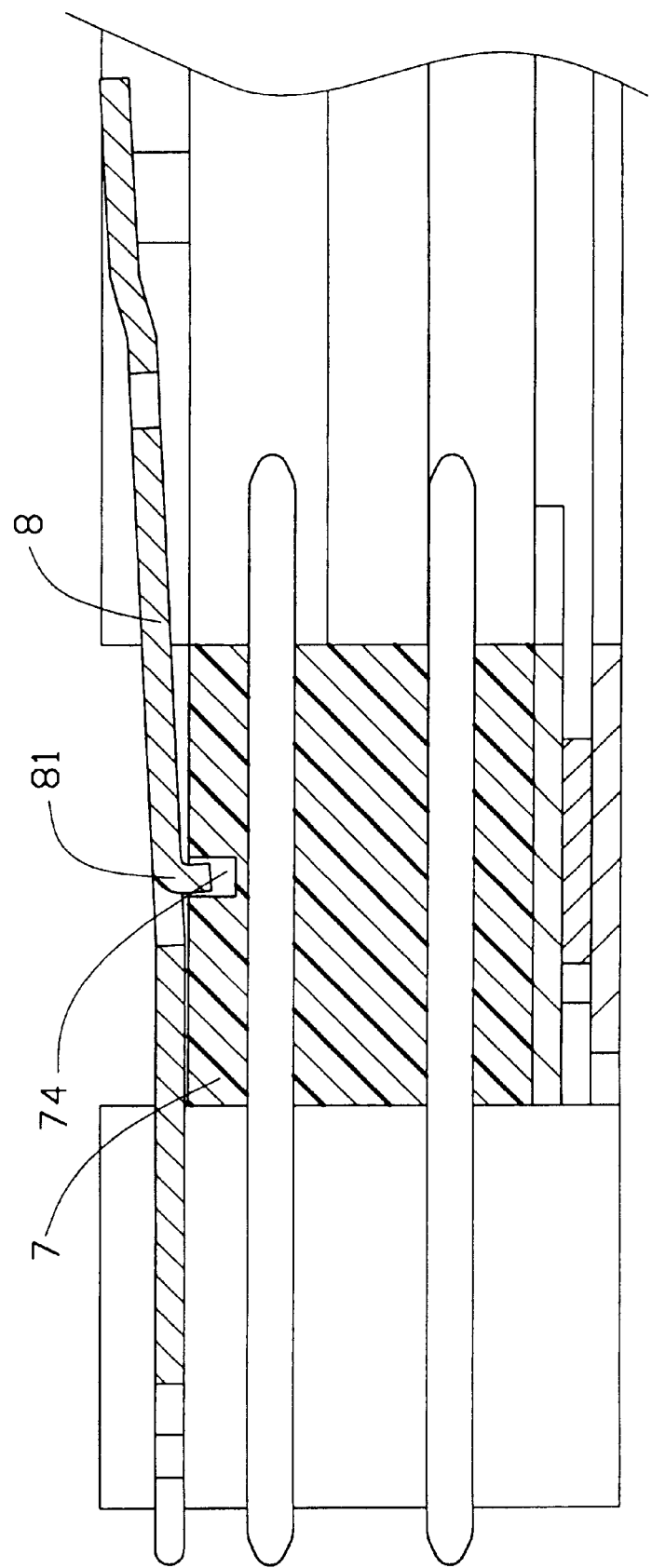
FIG. 3 is a partial, cross-sectional view of FIG. 2 taken along line 3—3.
Figure 4:
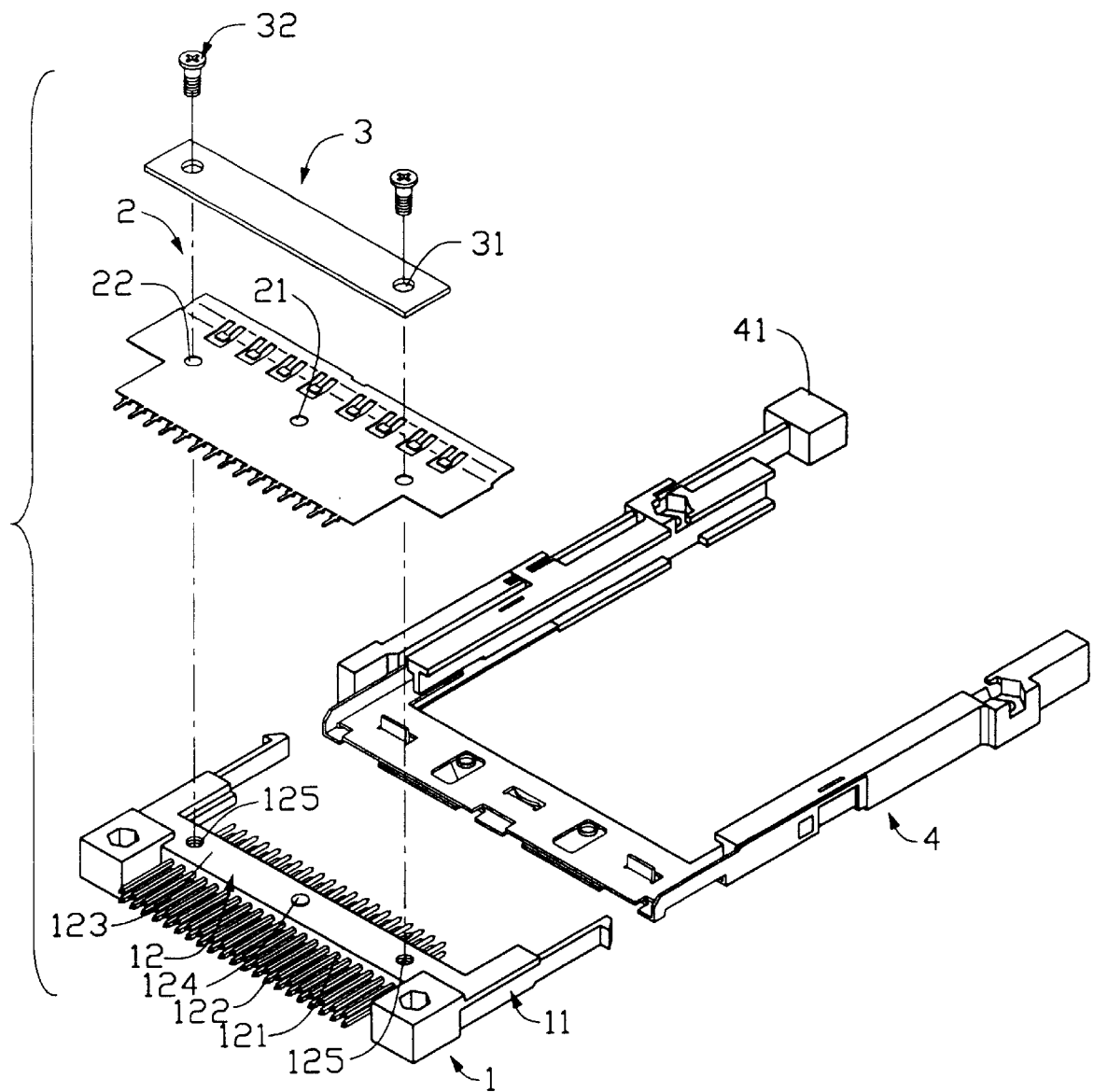
FIG. 4 is an exploded view of an electrical card connector embodying the concepts of the present invention.

FIG. 4 shows an electrical card connector in accordance with the present invention comprising a header 1, a grounding plate 2, a pressing sheet 3 and a casing 4 for receiving an electrical card (not shown) and retaining a card ejecting mechanism 41.

The header 1 includes two arms 11 parallel to each other for receiving an electrical card (not shown) therebetween and a body 12 connecting the two arms 11. The body 12 defines a plurality of passageways 121 each receiving a terminal 122 therein. A protrusion 124 is formed on a middle portion of a top surface 123 of the body 12. A pair of screw holes 125 is defined in the top surface 123 proximate opposite ends thereof. The grounding plate 2 forms a seating hole 21 for receiving the protrusion 124 of the header 1, and a pair of first holes 22 corresponding to the screw holes 125 of the header 1. The pressing sheet 3 is a rigid board for preventing the grounding plate 2 from dislodged from the header 1, and includes a pair of second holes 31 corresponding to the first holes 22 of the grounding plate 2. A pair of screws 32 extend through the second holes 31 and the first holes 22 to threadedly engage with the screw holes 125.

Figure 5:
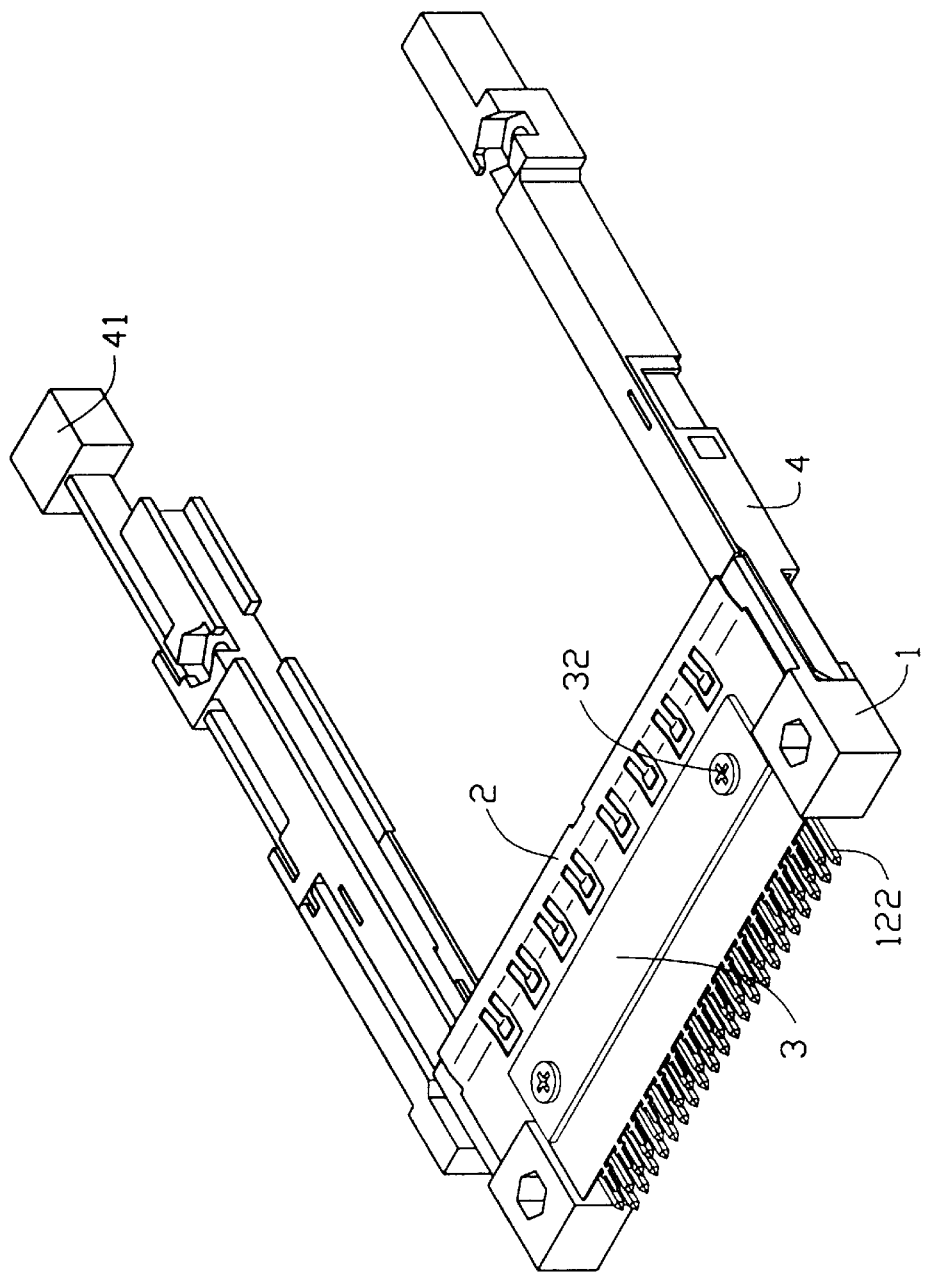
FIG. 5 is an assembled view of FIG. 4.

Referring to FIG. 5, in assembly, the grounding plate 2 is attached to the top surface 123 of the header 1 and the protrusion 124 of the header 1 extends through the seating hole 21 of the grounding plate 2. The pressing sheet 3 is attached to the grounding plate 2 for preventing the plate 2 from becoming dislodged from the header 1. Each screw 32 extends through the corresponding second hole 31 of the pressing sheet 3 and the corresponding first hole 22 of the grounding plate 2 to threadedly engage with the corresponding screw hole 125 of the header 1, thereby securely attaching the grounding plate 2 to the header 1.

It is understood that the invention may be embodied in other specific forms without departing from the spirit of the central characteristics thereof. Thus, the present examples and embodiments are to be considered in all respects as illustrative and not restrictive, and the invention is not to be limited to the details given herein.

What is claimed is:

1. An electrical card connector comprising:

a header having a pair of arms adapted for receiving an electrical card therebetween and a body connecting the pair of arms, the body defining a screw hole on a top surface thereof;

a grounding plate attached to the top surface of the header, the grounding plate defining a first hole;

a pressing sheet attached to the grounding plate, the pressing sheet having a second hole; and a screw extending through the second hole of the pressing sheet and the first hole of the grounding plate to threadedly engage with the screw hole of the header.

2. The electrical card connector as described in claim 1, wherein a protrusion is formed on a middle portion of the top surface of the header, and a seating hole is defined in the grounding plate corresponding to the protrusion.

3. The electrical card connector as described in claim 1, wherein two screw holes are defined in the top surface of said header, proximate opposite ends thereof, two first holes are defined in said grounding plate proximate opposite ends thereof corresponding to the screw holes of said header, and two second holes are defined in said pressing sheet proximate opposite ends thereof corresponding to the screw holes of said header.

4. The electrical card connector as described in claim 1, wherein said pressing sheet is a rigid board.

5. An electrical card connector comprising:

a header having a pair of arms adapted for receiving an electrical card therebetween and a body connecting the pair of arms, the body defining a screw hole and an orientation protrusion on a top surface thereof;

a grounding plate attached to the top surface of the header, the grounding plate defining a first hole in alignment with said screw hole, and an orientation hole for engagingly receiving the corresponding orientation protrusion therein;

a pressing sheet attached to the grounding plate, the pressing sheet having a second hole; and a screw extending through the second hole of the pressing sheet and the first hole of the grounding plate to threadedly engage with the screw hole of the header for securing the grounding plate to the header.

* * * * *